US009515832B2

United States Patent
Agarwal et al.

(10) Patent No.: US 9,515,832 B2
(45) Date of Patent: Dec. 6, 2016

(54) PROCESS AUTHENTICATION AND RESOURCE PERMISSIONS

(71) Applicant: Microsoft Corporation, Redmond, WA (US)

(72) Inventors: Vishal Agarwal, Kirkland, WA (US); Sunil P. Gottumukkala, Redmond, WA (US); Arun U. Kishan, Kirkland, WA (US); Dave M. McPherson, Bothell, WA (US); Jonathan M. Andes, Seattle, WA (US); Giridharan Sridharan, Redmond, WA (US); Kinshuman Kinshumann, Redmond, WA (US); Adam Damiano, Redmond, WA (US); Salahuddin J. Khan, Redmond, WA (US); Gopinathan Kannan, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 288 days.

(21) Appl. No.: 13/925,703

(22) Filed: Jun. 24, 2013

(65) Prior Publication Data

US 2014/0380058 A1 Dec. 25, 2014

(51) Int. Cl.
*H04L 9/32* (2006.01)
*H04L 9/08* (2006.01)
(Continued)

(52) U.S. Cl.
CPC ............. *H04L 9/3247* (2013.01); *G06F 21/51* (2013.01); *G06F 21/53* (2013.01); *H04L 9/083* (2013.01);
(Continued)

(58) Field of Classification Search
CPC .............. G06F 9/468; G06F 21/51; G06F 21/53–21/54; G06F 2221/2113; G06F 2221/2145; G06F 2221/2149; H04L 9/3247–9/3257; H04L 9/3263–9/3268; H04L 9/3281–9/3286; H04L 63/0823
See application file for complete search history.

(56) References Cited

U.S. PATENT DOCUMENTS 6,023,765 A * 2/2000 Kuhn ................... G06F 21/6218
713/166
6,289,462 B1 * 9/2001 McNabb ............. G06F 21/6218
726/21
(Continued)

FOREIGN PATENT DOCUMENTS

EP 1225512 A1 7/2002
WO 02/25409 A2 3/2002

OTHER PUBLICATIONS

"How Certificates Work". Microsoft TechNet. <https://technet.microsoft.com/en-us/library/cc776447(v=ws.10).aspx> Updated: Mar. 28, 2003.*
(Continued)

*Primary Examiner* — Ashok Patel
*Assistant Examiner* — Kevin Bechtel
(74) *Attorney, Agent, or Firm* — Tim Churna; Dan Choi; Micky Minhas

(57) ABSTRACT

The techniques and systems described herein present various implementations of a model for authenticating processes for execution and specifying and enforcing permission restrictions on system resources for processes and users. In some implementations, a binary file for an application, program, or process may be augmented to include a digital signature encrypted with a key such that an operating system may subsequently authenticate the digital signature. Once the binary file has been authenticated, the operating system may create a process and tag the process with metadata indicating the type of permissions that are allowed for the process. The metadata may correspond to a particular access level for specifying resource permissions.

18 Claims, 7 Drawing Sheets

(51) Int. Cl.
*G06F 21/51* (2013.01)
*G06F 21/53* (2013.01)

(52) U.S. Cl.
CPC .............. *G06F 2221/2113* (2013.01); *G06F 2221/2145* (2013.01)

(56) References Cited

U.S. PATENT DOCUMENTS

| | | | |
|---|---|---|---|
| 8,381,306 | B2 | 2/2013 | McPherson et al. |
| 2006/0037082 | A1 | 2/2006 | LaMacchia et al. |
| 2008/0022093 | A1 | 1/2008 | Kurien et al. |
| 2008/0201766 | A1* | 8/2008 | Amirov .............. G06F 21/6227 726/4 |
| 2008/0301469 | A1 | 12/2008 | Plouffe et al. |
| 2009/0158026 | A1* | 6/2009 | Charles ............... G06F 21/575 713/2 |
| 2013/0024929 | A1 | 1/2013 | Abraham et al. |
| 2013/0042101 | A1* | 2/2013 | Neumann ............ H04L 9/3247 713/156 |

OTHER PUBLICATIONS

Chaudhuri, et al., "A Type System for Data-Flow Integrity on Windows Vista", In Proceedings of the Workshop on Programming Languages and Analysis for Security, Jun. 8, 2008, 12 pages.
"Code Signing Guide", Published on: Jul. 23, 2012, Available at <<http://developer.apple.com/library/mac/documentation/Security/Conceptual/CodeSigningGuide/CodeSigningGuide.pdf>>, 37 pages.
"Protected Processes", Published on: Nov. 27, 2006, Available at <<http://download.microsoft.com/download/a/f/7/af7777e5-7dcd-4800-8a0a-b18336565f5b/process_Vista.doc>>, 5 Pages.
Vijayakumar, et al., "Process Firewalls: Protecting Processes During Resource Access", In Proceedings of the 8th ACM European Conference on Computer, Apr. 15, 2013, 14 pages.
"International Search Report & Written Opinion for PCT Patent Application No. PCT/US2013/061080", Mailed Date: Feb. 13, 2014, Filed Date: Sep. 21, 2013, 10 Pages.
Samarati, et al., "Access Control: Policies, Models, and Mechanisms", In Lecture Notes in Computer Science/Computational Science, vol. 2171, Sep. 1, 2000, pp. 137-196.
"Office Action Issued in Russian Patent Application No. 2015155272", Mailed Date: Jan. 29, 2015, 2 Pages. (English language letter reporting Russian Office Action attached).

* cited by examiner

PROCESS AUTHENTICATION AND RESOURCE PERMISSIONS

BACKGROUND

Most operating systems strive to provide a secure processing environment in which processes are authenticated, and where access permissions to system resources are defined and enforced. As a basic example, an operating system may provide two types of permission levels, one for administrators and one for users. Administrators may have access to all system resources, including files, directories, and system configuration settings. By contrast, a user may have restricted access to a strict subset of system resources. In regard to authenticating processes, many models rely on the trustworthiness of the channel through which the software is acquired.

In a typical environment, an operating system uses a concentric model for specifying resource permission levels, where different permission levels would correspond to different concentric circles in the concentric model such that increasing levels of permission would inherit all of the permissions of all lower levels. Such a concentric model of permissions provides for very fast determinations of permissions.

In another typical environment, an operating system may use a tailored permission system, where individual users are specified with a particular set of permissions. Such a model provides for a very individualized definition of permissions, however this model suffers from requiring a more computationally intensive method for verifying permission requests to access system resources.

SUMMARY

The techniques and systems described herein present various implementations of a secure processing model for authenticating processes for execution and also for specifying and enforcing permission restrictions on system resources for processes and users.

In some implementations, an executable file may be authenticated based on a digital signature included with the executable file such that prior to a process being created, the operating system uses a decryption key to verify that the executable file is received from a software publisher as the software publisher intended. For example, an executable file for an application, program, or process may be augmented to include a digital signature encrypted with an encryption key such that an operating system may authenticate the digital signature using a corresponding decryption key. Once the executable file has been authenticated, the operating system may create a process for executing the executable file.

Further, the operating system may tag the process with metadata indicating what type of permissions are allowed for the process based on the digital signature for the corresponding executable file. The metadata may correspond to resource permission information that is defined in terms of dimensions and levels such that for a given level, it is not necessarily the case that the permissions at a higher level inherit the permissions of a lower level.

This summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
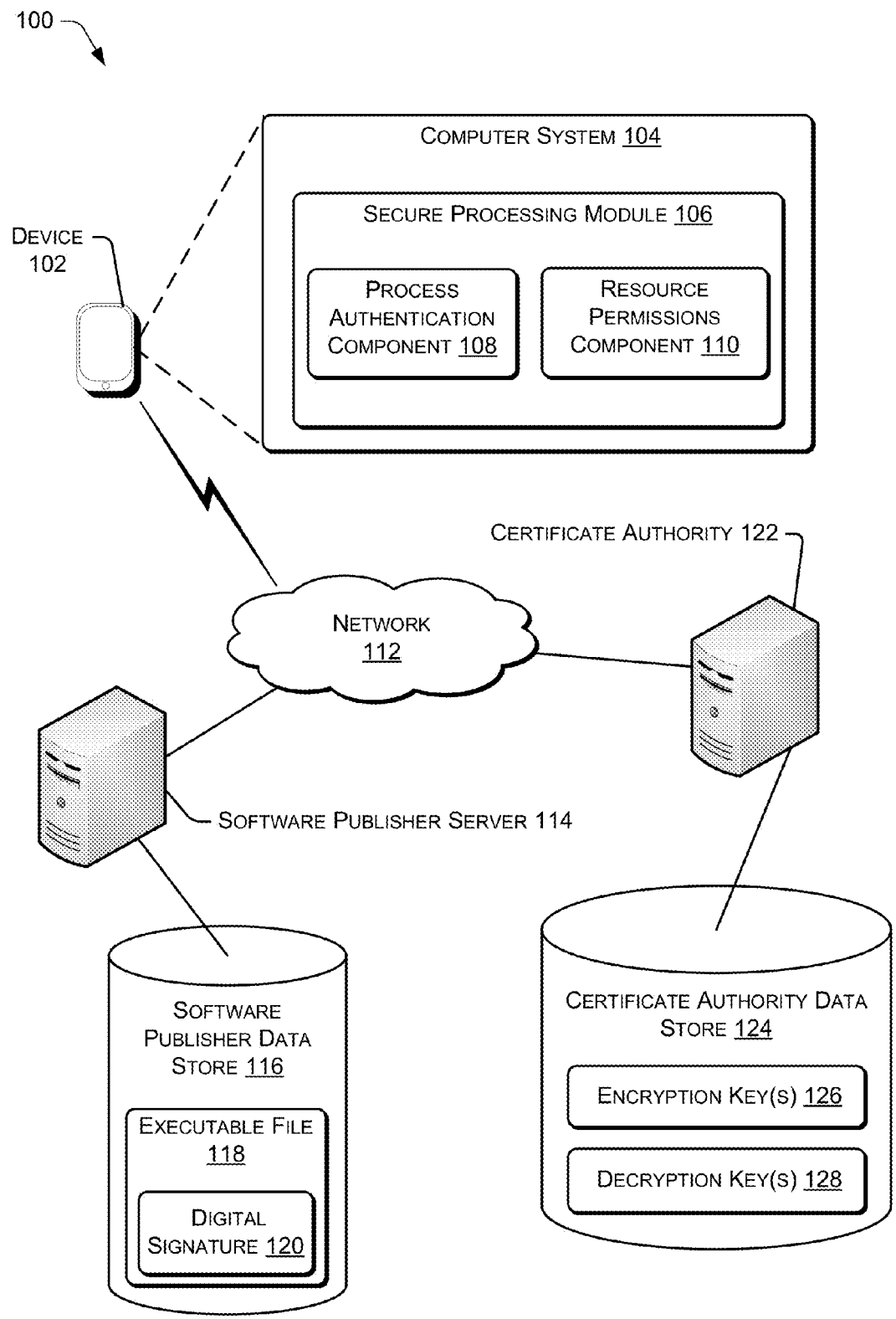
FIG. 1 illustrates an example computing environment in which a device implements a secure processing module that includes a process authentication component and a resource permissions component.

The techniques and systems described herein are directed to various implementations of a secure processing system for authenticating processes for execution and for specifying and enforcing permission restrictions on system resources for processes and/or users. Within the secure processing system, a process authentication component may serve to authenticate processes, while a resource permissions component may serve to specify and enforce permissions restrictions using combinations of dimensions and levels.

In some cases, if an operating system were to simply create a process for an executable file without any type of authentication, there is the risk that the executable file was modified to include a virus. In this scenario, when the operating system creates a process to execute the executable file, the virus would be introduced into the operating system. To address this problem, in some implementations, to determine whether or not an executable file has been received from a software provider or publisher without any tampering or modifications, the software publisher may provide a digital signature with the executable file so that the operating system may authenticate the executable file. The digital signature may be created by the software publisher using an encryption key. Further, in some implementations, an identity of the software publisher may be determined from an encryption or decryption key. The operating system, in turn, may use a decryption key corresponding to the encryption key to authenticate the executable file based on decrypting the digital signature. In some implementations, asymmetric encryption techniques may be used in determining that software from a given source is trustworthy. For example, the digital signature may be created using a private key and the digital signature may be decrypted using a public key.

To provide some context, in order to protect a system from damage or to protect confidential or restricted user information, an operating system may strive to prevent certain system processes from performing malicious activities, such as writing code into a protected process, or from disabling malware detection software. Further, within an operating system, to provide privacy or security, an operating system may not allow every user or process to access or modify any or every system resource. A system resource may be a file, a directory, or any type of software element. Further, a system resource may also be any hardware element, for example an I/O port, a particular processing unit, a storage device, or a region of memory, among others.

In some implementations, an operating system may restrict even users with the highest possible levels of user access, from accessing certain system resources. Additionally, an operating system may reserve a dimension and level of resource access to a certain set of system processes, and prevent any user from an equal level of resource access. As used herein, a dimension, in addition to sets of levels, provides a resource permissions component with the ability to specify sets of permissions for accessing system resources that are more flexible than with the use of concentrically or hierarchically inherited permission levels. Further, in some implementations, a particular combination of a dimension and level may be referred to as a trust level, or a tuple. In an implementation using two dimensions, a tuple, such as {DIMENSION,LEVEL}, may be defined according to two parameters: (1) a dimension, and (2) a level. In general, a trust level, or tuple, may be defined according to additional dimensions. For example, in an implementation using two dimensions, the corresponding tuple may be referred to as a two dimension tuple. Similarly, in an implementation using N dimensions, the corresponding tuple may be referred to as an N dimension tuple, which may be defined according to N parameters.

In different implementations, through the use of a combinations of dimensions and levels, a resource permissions component may specify sets of resource permissions that are beyond concentric and hierarchically inherited resource permissions. In other words, the resource permissions component may specify multidimensional and extraconcentric permission sets. Further, permission sets may be defined such that one permission set does not necessarily include all of the permissions of a permission set at a lower level. Instead, in different implementations, processes within an operating system may be tagged with resource permission information such that distinct, but related, permission sets do not inherit all of the permissions of a permission set at a lower level.

In some implementations, using dimensions and levels in specifying resource access permissions greatly reduces the computational complexity of determining whether or not to grant access to a system resource because the resource permissions component may need only two comparisons to determine whether a user or process has sufficient permission to access a system resource. In other words, using dimensions and levels, inheritance of permission sets is combined with related, but distinct permission sets that do not inherit all of the permissions of lower level permission sets. In some implementations, dimensions serve to specify the relatedness of different sets of levels of permissions.

In other words, in some implementations, whether a process or user may access a resource is not simply a hierarchical or simply a concentric set consideration, and the various combinations of dimension and levels in regard to having access to other dimension and levels may be configured in different ways.

Example Implementations

FIG. 1 illustrates a computing environment 100 including a device 102, which includes a computer system 104 that may be configured to implement secure processing module 106, process authentication component 108, and resource permissions component 110. In this implementation, device 102 may provide an operating system that allows users to install new software, for example, using an online application store, or over a wireless link, or a removable memory card, or through some other manner for accessing software.

In a particular implementation, device 102 may access software over a network, such as network 112, that may be provided by a software publisher. In this example, the software publisher may provide software publisher server 114, which may communicate with device 102 to provide software. The software publisher server 114 may store executable files for software on software publisher data store 116. In this example, an executable file provided by the software publisher may be executable file 118. In general, an executable file may be any file that may be used as the basis for creating a software process for executing within an operating system. An executable file may also be referred to as a binary file, a binary, or an executable program, a dynamically loaded module, among other terms of art.

As discussed above, an executable file may include a digital signature, such as digital signature 120. While in this example, the digital signature is embedded within the executable file, in other examples, the digital signature may be provided separate from the executable file either in response to the request for the executable file or in response to a separate and specific request for the digital signature. Further, in some implementations, the encryption key used in creating the digital signature and the decryption key used in authenticating the executable file using the digital signature may be managed from a certificate authority, such as certificate authority 122. Certificate authority 122 may in turn store encryption key(s) 126 and decryption key(s) 128 within certificate authority data store 124.

In an illustrative implementation, a user that may be operating device 102 may initiate a download of a software application, or otherwise choose to install a software program. For example, the user may navigate, through a web browser, to a given website providing for a software download. In other cases, the user may use an application store interface for finding and initiating installations of software or the user may access physical media or over a direct wireless link. However, the manner in which software is accessed is not relevant to the authentication of the executable file.

In this example, in response to the user initiating a download and install of the software application, the software publishing server 114 may transmit an executable file 118 stored on software publisher data store 116. Further in this example, executable file 118 may include a digital signature 120. In this example, the software publisher or software developer, in creating the executable file, may create a digital signature using an encryption key.

In this example, an asymmetric encryption strategy with public and private keys is used, however, different types of encryption techniques may be used. In this implementation, the software publisher or developer may use a private key as an encryption key to create the digital signature with the expectation that an operating system onto which the executable file is to be installed would use a public key as a decryption key on the digital signature to validate the authenticity of the executable file.

As depicted in the illustrative implementation of FIG. 1, certificate authority 122 may be used as a trusted intermediary for storing and providing encryption and/or decryption keys, such as encryption key(s) 126 and decryption key(s) 128. For example, the certificate authority 130 may provide a device 102 with a necessary decryption key corresponding to the encryption key used by the software publisher in creating the digital signature. However, in other scenarios, the operating system on device 102 and the software publisher server 114 may acquire the necessary encryption and decryption keys through other methods, for example, without the use of a certificate authority.

In this implementation, once the resource permissions component 110 on device 102 has the public key to apply to the digital signature on the downloaded executable file, the resource permissions component 110 on device 102 may then determine whether or not the executable file is authentic and/or untampered with based on the digital signature and a successful decryption. Further, in some implementations of a secure processing system, the process authentication component may be implemented alone, and such a standalone implementation would provide security because a process would not be created to execute an executable file unless the corresponding executable file were authenticated.

In other words, the process authentication component can minimize any tampering that may otherwise occur as the executable file is transmitted across a network which may include one or more malicious points of transit. Such a standalone implementation of a process authentication component may further serve to validate that software is from the actual software publisher instead of another party, such as a malicious or fraudulent party. However, in this illustrative example, the authentication of a binary file serves as one step of an overall secure processing system.

Specifically, in this illustrative example, the digital signature corresponding to the binary file may be created with one of multiple different encryption keys, where each different encryption key may correspond to a different amount or type of resource access on the operating system creating a corresponding process. For example, a software publisher may use one of three different encryption keys for creating a digital signature to include within an executable file for an application or include along with the executable file. In this case, each of the different encryption keys would correspond to a different amount or type of resource access. For example, there may be three levels of resource access, a low, medium, and high level of resource access.

In this way, when the secure processing system receives or accesses an executable file, the secure processing system may create a process with a level of access that depends on which decryption key successfully authenticates the executable file. Further, in this example, a particular decryption key, corresponding to a specified level of access, may successfully authenticate the executable file. To illustrate, if a decryption key corresponding to a low level of resource access serves to successfully decrypt the digital signature for the binary file, then in response the secure processing system would create a process corresponding to the executable file that has a low level of resource access. Similarly, if a decryption key corresponding to a medium level of resource access serves to successfully decrypt the digital signature for the binary file, then in response the secure processing system would create a process corresponding to the executable file that has a medium level of resource access. Similarly, if a decryption key corresponding to a high level of resource access serves to successfully decrypt the digital signature for the binary file, then in response the secure processing system would create a process corresponding to the executable file that has a high level of resource access.

In some implementations of a secure processing system, using the different encryption and decryption keys to correspond to different levels of resource access may provide a sufficient technique for authenticating executable files and for assigning the corresponding process or processes with an appropriate level of resource access. In this case, each increasing hierarchical level of resource access would encompass each level of resource access lower in the hierarchy. This strictly increasing amount of resource access may be described with concentric sets of access.

However, in this illustrative example, the resource permissions component 110 of the secure processing system may provide more nuanced resource access permissions. In other words, the secure resource permissions component 110 may establish distinct, but related dimensions of concentric permission sets such that any given permission set at a higher level does not necessarily inherit the permissions of a permission set at a lower level. Instead, a combined specification of levels and dimensions are used in determining resource privileges.

To illustrate, instead of using three encryption and decryption key pairings to determine three concentric levels of resource privileges, each different encryption/decryption key pairing may correspond to a particular dimension and level of resource privileges, and the number of different encryption/decryption key pairings may depend on a number of dimensions and a number of levels of resource privileges. Further, to set the access level sufficient to access a particular resource, a process may be specified to have at least a given dimension and level of resource permission before setting a sufficient permission for accessing a resource to be at least the dimension and access level associated with the process. In other words, a particular user or process may not set a resource permission to be higher than the resource permissions granted to the particular user or process.

Figure 2:
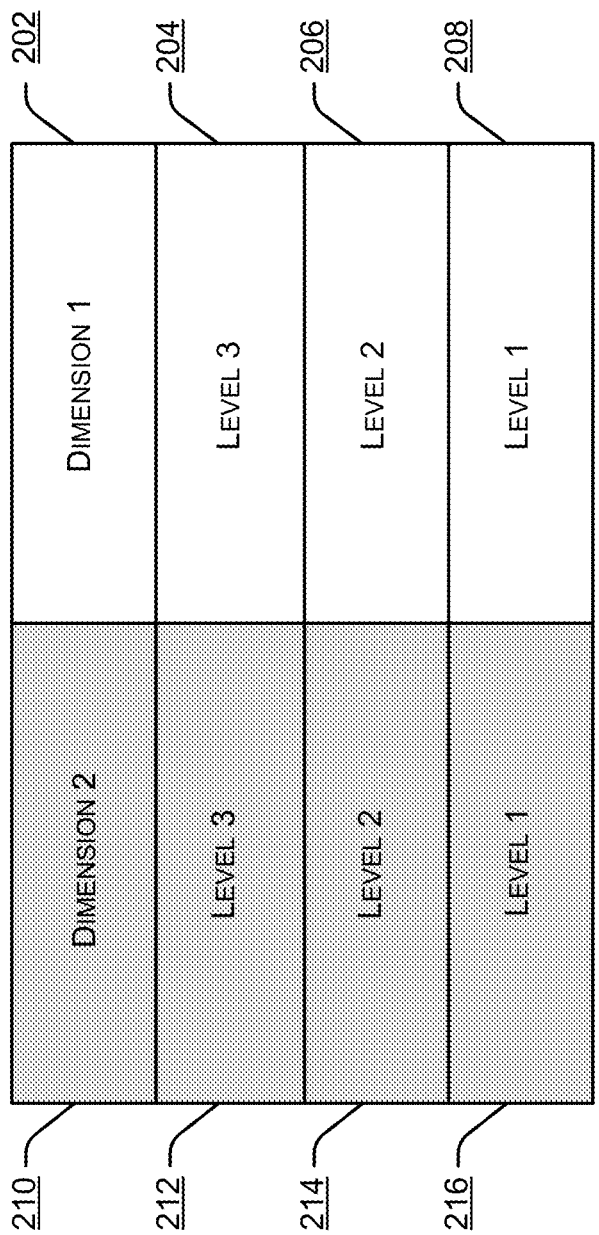
FIG. 2 illustrates a first example relationship between dimensions and levels that may be utilized to specify resource access permissions, according to some implementations.

FIG. 2 provides an illustrative implementation of the use of dimensions and levels in specifying resource access privileges. In this example, there are three levels of resource privileges such that within a given dimension, the resource privileges of each increasing level includes all of the resource privileges of all lower levels. In this example, level 1 may correspond to a lowest level of resource access privileges, level 2 may correspond to a medium level of resource access privileges that includes all resource access privileges of level 1 including additional resource access privileges, and level 3 may correspond to a medium level of resource access privileges that includes all resource access privileges of both levels 1 and 2 including additional resource access privileges not within the lower levels.

As illustrated, FIG. 2 depicts one example with two dimensions where each dimension includes three levels. Namely, dimension 1, depicted at 202, with corresponding levels 3, 2, and 1, depicted at, respectively, 204, 206, and 208, and dimension 2, depicted at 210, and corresponding levels 3, 2, and 1, depicted at, respectively, 212, 214, and 216. In this example, two dimensions are specified, but a different number of dimensions may be used in other examples.

In this illustrative implementation, the fact that a particular level of resource access privilege is greater than another level is not sufficient to an operating system to grant resource access privileges corresponding to the lower levels. In other words, level 3 does not necessarily include permissions for level 2. Instead, the resource permissions component uses a number of dimensions in conjunction with a level in order to decide whether or not access to a process or user is granted to a particular resource.

As depicted in FIG. 2, there are six different possible grants of resource access privileges, corresponding to a 2-tuple of {dimension, level}, which in this case may be represented with {D1,L1}, {D1,L2}, {D1,L3}, {D2,L1}, {D2,L2}, and {D2,L3}, where D1 refers to dimension 1, D2 refers to dimension 2, and L1-L3 refer to levels 1-3. As noted above, in different implementations, there may be additional dimensions.

In this implementation, each dimension/level tuple corresponds to a respective set of resource access privileges. In other words, a given trust level may include a particular set of resource access permissions in addition to potentially including other resource access permissions. Specifically, {D1,L1} corresponds to one or more sets of resource access privileges; {D1,L2} corresponds to one or more sets of resource access privileges that encompasses the resource access privileges of {D1,L1}; {D1,L3} corresponds to one or more sets of resource access privileges that encompasses the resource access privileges of {D1,L2} and {D1,L1}; {D2,L1} corresponds to one or more sets of resource access privileges that encompasses the resource access privileges of {D1,L1}; {D2,L2} corresponds to one or more sets of resource access privileges that encompasses the resource access privileges of {D2,L1}, {D1,L2}, and {D1,L1}; and {D2,L3} corresponds to one or more sets of resource access privileges that encompasses the resource access privileges of {D2,L2}, {D2,L1}, {D1,L3}, {D1,L2}, and {D1,L1}. Further, in some implementations, when a given trust level corresponds to a given one or more sets of resource access privileges, it may be that a subset of the one or more sets encompass the resource access privileges of another trust level.

In some implementations, when a given trust level corresponds to one or more resource access permission sets that encompass the resource access permission sets of another trust level, it may be said that the given trust level "dominates" the other trust level. In the dimension and level specification of FIG. 2, the above description may also be described as {D1,L1} dominating no other trust level; {D1,L2} dominating {D1,L1}; {D1,L3} dominating {D1, L2}, and {D1,L1}; {D2,L1} dominating {D1,L1}; {D2,L2} dominating {D2,L1}, {D1,L2}, and {D1,L1}; {D2,L3} dominating {D2,L2}, {D2,L1}, {D1,L3}, {D1,L2}, and {D1,L1}.

In other words, in this example, there are sets of resource access privileges at higher levels that do not include or encompass all of the resource access privileges of lower levels. For example, {D1,L3} does not include the resource access privileges of any tuple including dimension 2, including tuples with dimension 2 at lower levels, including {D2,L2} and {D2,L1}.

Given such a set of resource access permissions corresponding to the dimensions and levels of FIG. 2, the process authentication component and the resource permissions component may both refer to the same framework for specifying resource permissions. In other words, the resource access privileges granted to a process that may be created to correspond to an authenticated executable file may depend on which decryption key is used to authenticate the binary file. In the example dimensions and levels illustrated in FIG. 2, there may be six different encryption/decryption key pairings corresponding to the six tuples of {D1,L1}, {D1,L2}, {D1,L3}, {D2,L1}, {D2,L2}, and {D2, L3}. In such a resource access privilege set specification, the encryption/decryption key pairings do not necessarily have a relative ranking because some resource access permission sets at higher levels may not encompass resource access permissions sets from lower levels.

Figure 3:
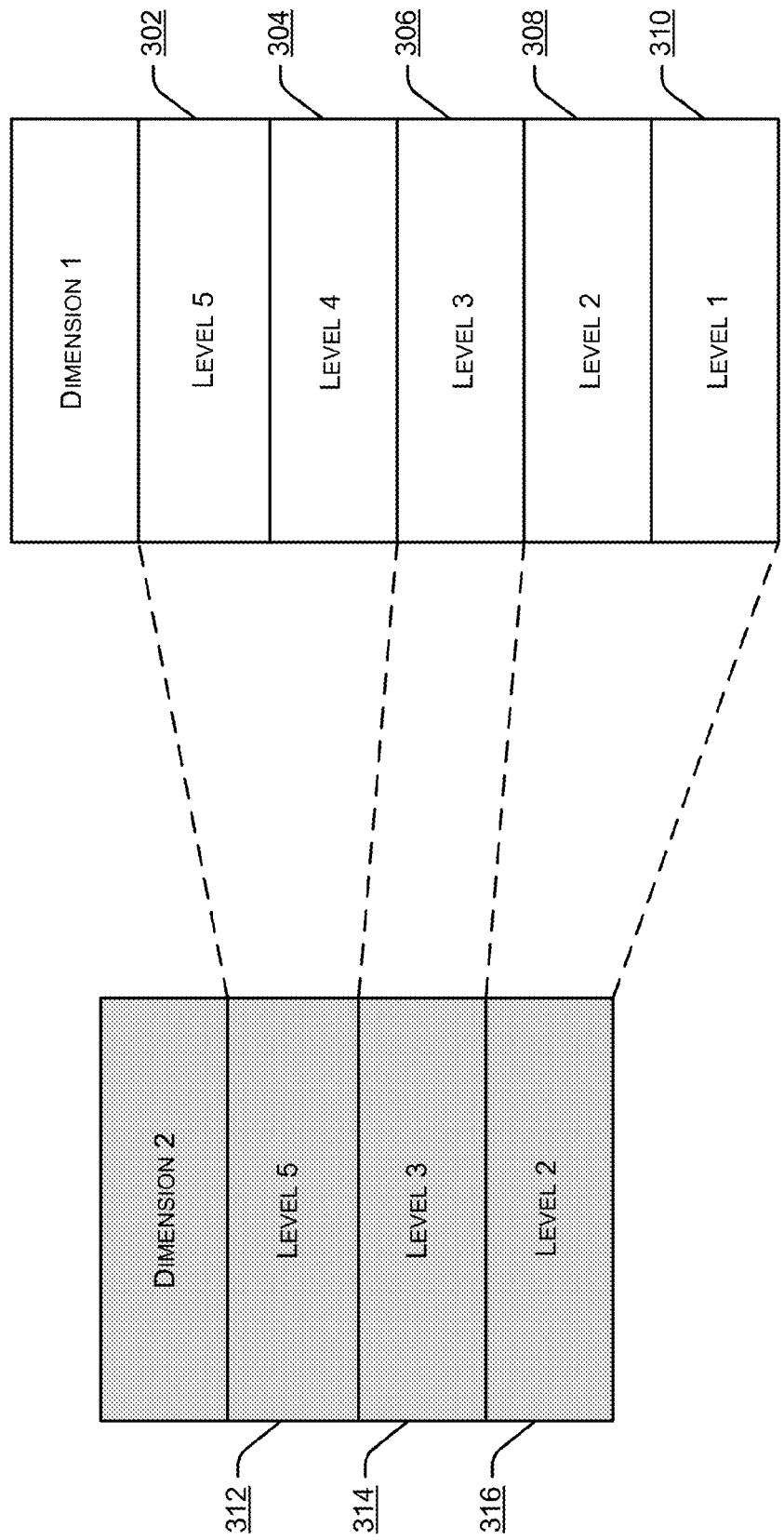
FIG. 3 illustrates a second example relationship between dimensions and levels that may be utilized to specify resource access permissions, according to some implementations.

FIG. 3 illustrates a different specification of dimensions and levels that may be used in an implementation of a resource permissions component. As illustrated in FIG. 3, different dimensions may have different levels associated with a particular dimension. As illustrated, dimension 1 may have five levels, depicted with 302, 304, 306, 308, and 310, and dimension 2 may have three levels, depicted with 312, 314, and 316. In this implementation, to allow for a simpler description of the comparison operations, the levels of dimension 1 are consecutively labeled as 1-5, and the levels of dimension 2 are labeled as 2, 3, and 5. A more general description of a mapping between trust levels is discussed below. However, even in such an implementation, similar to the implementation described in regard to FIG. 2, determining whether or not a user or process has sufficient access to a system resource may be performed based on two comparisons in the case when two dimensions are used. In general, for an N dimension tuple, permission may be determined with N comparisons. Specifically, in the implementation of FIG. 3, when one dimension and level corresponds to multiple levels of another dimension, determining whether the one dimension and level dominates any of the multiple levels in the other dimension may be done with two comparisons.

In this implementation, {D1,L1} may correspond to a set of resource access privileges; {D1,L2} may correspond to a set of resource access privileges that encompasses the resource access privileges of {D1,L1}; {D1,L3} may correspond to a set of resource access privileges that encompasses the resource access privileges of {D1,L2} and {D1, L1}; {D1,L4} may correspond to a set of resource access privileges that encompasses the resource access privileges of {D1,L1}, {D1,L2}, and {D1,L3}; {D1,L5} may correspond to a set of resource access privileges that encompasses the resource access privileges of {D1,L1}, {D1,L2}, {D1,L3}, and {D1,L4}; {D2,L2} may correspond to a set of resource access privileges that encompasses the resource access privileges of {D1,L2} and {D1,L1}; {D2,L3} may correspond to a set of resource access privileges that encompasses the resource access privileges of {D2,L2}, {D1,L3}, {D1,L2}, and {D1,L1}; {D2,L5} may correspond to a set of resource access privileges that encompasses the resource access privileges of {D2,L3}, {D2,L2}, {D1,L5}, {D1,L4}, {D1,L3}, {D1,L2}, and {D1,L1}. For example, to determine whether or not {D2,L2} dominates any other trust level may be calculated with two comparisons, a comparison of D2 against the other dimension, and a comparison of L2 against the other dimension, where if D2 is greater than or equal to another dimension AND if L3 is greater than or equal to the other level.

While the levels in dimension 2 have been defined to not use a mapping and to preserve a simple comparison of values to determine whether or not a level in one dimension dominates a level of another dimension, in general the levels may be specified according to any arbitrary token where a mapping table may specify relative "greater than" or "less than" indications between any two given tokens. For example, in regard to FIG. 3, levels 2, 3, and 5 may be redefined as levels "C", "B", and "A", respectively, where a mapping may be defined to specify that {D2,A} dominates {D2,B}, {D2,C}, {D1,L5}, {D1,L4}, {D1,L3}, {D1,L2}, and {D1,L1}; {D2,B} dominates {D2,C}, {D1,L3}, {D1, L2}, and {D1,L1}; {D2,C} dominates {D1,L2} and {D1, L1}; {D1,L5} dominates {D1,L4}, {D1,L3}, {D1,L2}, and {D1,L1}; {D1,L4} dominates {D1,L3}, {D1,L2}, and {D1, L1}; {D1,L3} dominates {D1,L2} and {D1,L1}; {D1,L2} dominates {D1,L1}; and {D1,L1} dominates no other trust level.

In some implementations, with regard to using dimensions and levels in specifying resource access permissions, a given process within an operating system may modify the dimension and/or level for specifying the resource access permissions of another process or resource. For example, a process may be a system process with resource access permissions corresponding to {D2,L3}, and another process may be a user process with resource access permissions corresponding to {D1,L4}. In this example, the system process may modify the resource access permissions for the user process from {D1,L4} to any dimension and level combination because the system process is at the highest combination of trust or highest combination of dimension and level. In some cases, the system process may decrease the amount of resource access permissions of the user process from {D1,L4} to, say, {D1,L2}. In other cases, the system process may change, which may potentially increase, the amount of resource access permission of the user process from {D1,L4} to, say, {D2,L2}.

Figure 4:
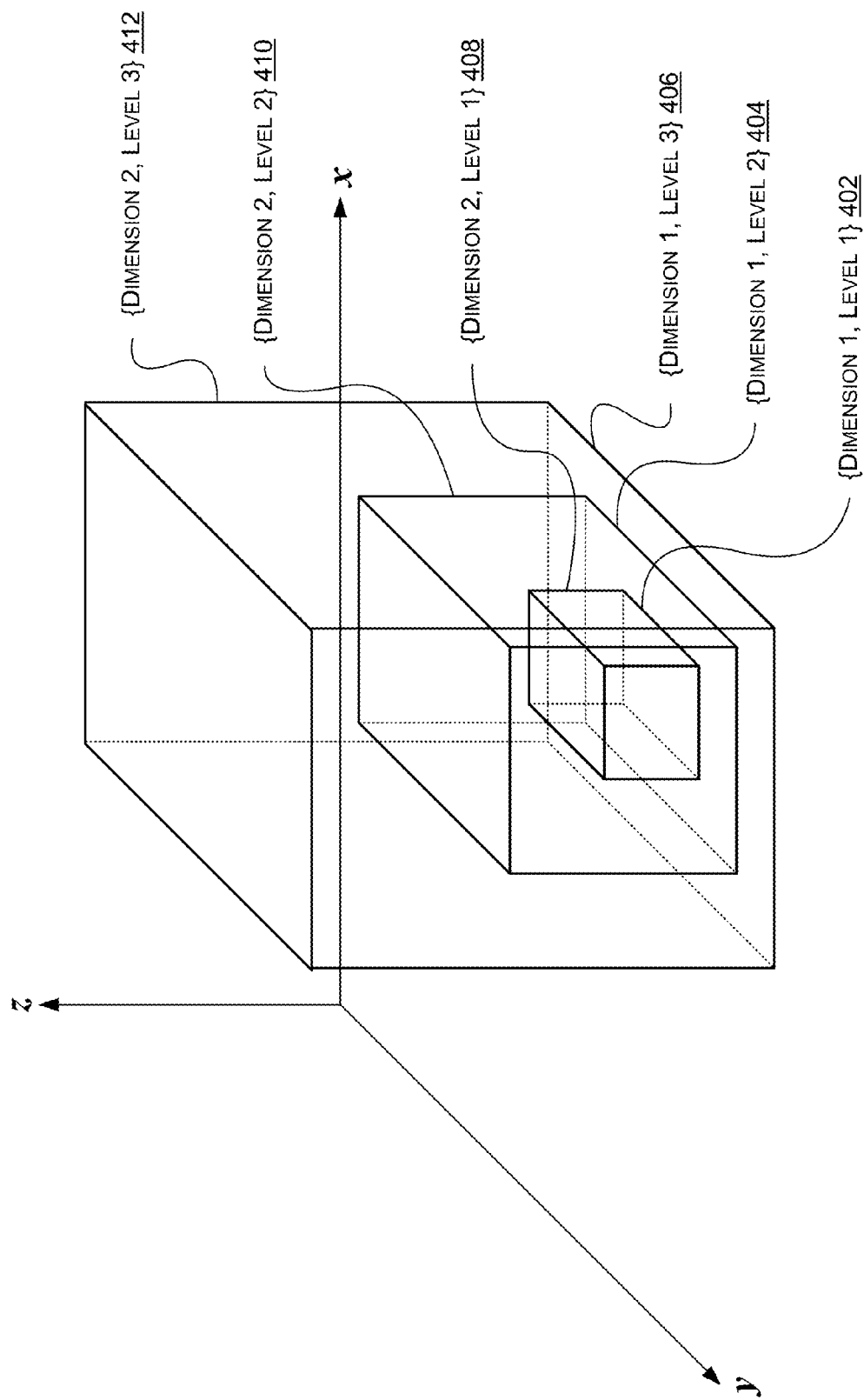
FIG. 4 illustrates an example of dimensions and levels depicting various resource access permission sets, according to some implementations.

FIG. 4 illustrates a visual representation of the dimensions and levels used in specifying resource access permissions such that the visual representation occupies xyz space. However, this visual representation is for illustrative purposes and serves to extend the understanding of the dimensions and levels as used by a resource permissions component. In this visual representation of resource permission sets, the x-y plane may represent resource permissions sets that are possible without the use of dimensions. Specifically, if only the x-y plane could be used, then resource permission sets would be concentric and smaller or lower level resource permission sets would be encompassed with larger or higher level resource permission sets.

In this illustrative visual representation, the footprints of the dimension/level boxes, which would be solely on the x-y plane may be representative of concentric permission sets, with each larger permission set inheriting or encompassing the permissions of the smaller permission set. In such an case, there would be no dimension, simply levels. In other words, the footprints of the three dimension/level boxes form three concentric sets, the smallest, innermost set corresponding to a first level, which may be encompassed by the next largest set corresponding to a second level, which may be encompassed by the largest set corresponding to a third level. However, in using dimensions in addition to using levels, a level of resource access does not necessarily include a lower level of resource access permission.

In this visual representation, corresponding to the dimensions and levels of FIG. 2, example resource access permission sets may be specified with two dimensions and three levels within each dimension. Specifically, within a given dimension, for example dimension 1, there may be three concentric permission sets, where each greater set encompasses (i.e. inherits) the access privileges or permissions of a lower set. In this visual representation, the permission set represented as the dimensions occupied within the x-y plane correspond to levels within a single dimension. However, when a second dimension is considered, then a permission set within one dimension at one level may not necessarily inherit all of the permissions of a permission set in another dimension at a lower level.

In this visual representation, dimension 1 occupies the x-y plane, and includes the concentric squares depicted with {DIMENSION 1, LEVEL 1} 402, {DIMENSION 1, LEVEL 2} 404, and {DIMENSION 1, LEVEL 3} 406, where each higher level within the dimension inherits the resource access privileges of the encompassed, lower level. In this visual representation, the scope of permission sets visually represented as 402, 404, and 406 may not extend into the z-axis, and would therefore not have the permissions of visually represented permission sets that may extend into the z-axis.

However, when the second dimension is considered, the permission sets may be represented as a visual extension into the z-axis, thereby granting volume to a permission set representations. In other words, in this example, the added dimension allows for {DIMENSION 2, LEVEL 1} 408, which would encompass the permission set represented as {DIMENSION 1, LEVEL 1} 402, while including resource permissions that are not in {DIMENSION 1, LEVEL 1}; where {DIMENSION 2, LEVEL 2} 410 would encompass the permission sets represented as {DIMENSION 2, LEVEL 1} 408, {DIMENSION 1, LEVEL 2} 404, and {DIMENSION 1, LEVEL 1} 401; and where {DIMENSION 2, LEVEL 3} 412 would encompass the permission set represented as {DIMENSION 2, LEVEL 2} 410, {DIMENSION 2, LEVEL 1} 408, {DIMENSION 1, LEVEL 3} 406, {DIMENSION 1, LEVEL 2} 404, and {DIMENSION 1, LEVEL 1} 402.

Illustrative Process Authentication Component

Figure 5:
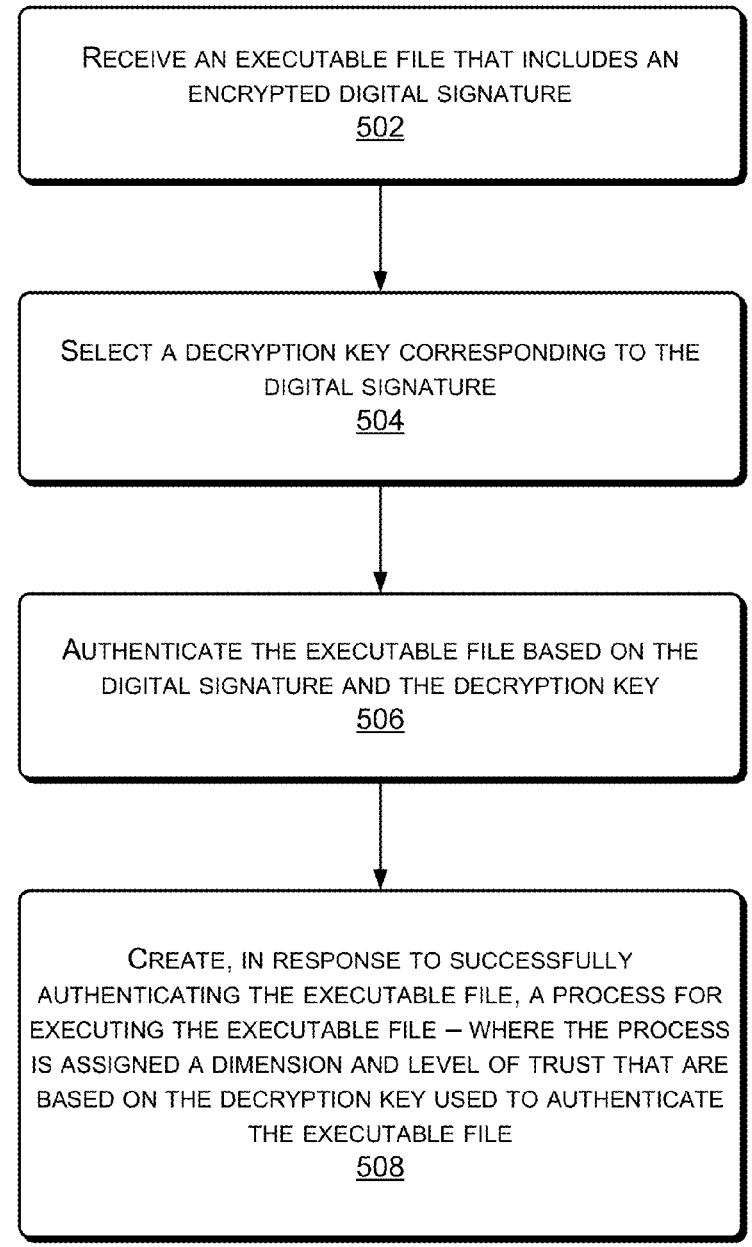
FIG. 5 illustrates a flowchart depicting a method to provide a process with access to a system resource when a dimension and a level of trust of the process satisfy specified requirements, according to some implementations.

FIG. 5 illustrates a flowchart 500 depicting selected operations in an implementation of a process authentication component. As discussed earlier in regard to FIG. 1, a process authentication component may determine authenticity of an executable file prior to creating a process corresponding to the executable file.

As discussed above, most computing devices provide an operating system that allows a user to install additional software or applications, either from physical media or wirelessly. However, in some cases, the operating system may itself, without direct user guidance, install additional software. In any case, there are various ways in which the process authentication component may gain access to, download, read, or receive an executable file.

As depicted at 502, the process authentication component may receive an executable file that includes an encrypted digital signature. While in this example, the executable file has been modified to include the digital signature, in other cases, the digital signature may be provided separately, or in response to a specific request for the digital signature.

As depicted at 504, the process authentication component may select or determine a decryption key that corresponds to the digital signature for the executable file. In some implementations, the decryption key may be a public key provided from a certificate authority, where the software publisher or software provider uses a corresponding private key to create the digital signature. In other implementations, the software publisher or software provider may use a public key to create the digital signature and the process authentication component would use a private key to decrypt the digital signature. Further, in different implementations, the software publisher and process authentication component may use different ways to obtain their respective encryption and decryption keys.

As depicted at 506, once the decryption key has been selected or determined, the process authentication component may authenticate the executable file based on the digital signature, the executable file, and based on the decryption key. For example, a successful decryption would indicate an authentic, or untampered with, executable file, and an unsuccessful decryption would indicate an executable file that may be corrupted in some way.

As depicted at 508, in response to the successful authentication of the executable file, the process authentication component may create or initiate the creation of a system process corresponding to the execution of the executable file—where the process is assigned a dimension and level that are based on the decryption key that was used to authenticate the executable file. In other words, a level of security or level of trust is attached to the created process based on the identity of the executable file determined according to the digital signature. For example, the software publisher may use multiple different encryption keys for creating a digital signature, depending on which type of resource permissions the process to execute the executable file may be assigned.

In some implementations, to ensure integrity of the created system process, the dimension associated with the digital signature may be placed into an authentication context of the created process. Further, the created process may be protected by a security descriptor that restricts access to the dimension of the created process. In different implementations, this process authentication may be applied to dynamically loaded modules. In some implementations, in the case that the created process itself creates additional processes or system resources, the additionally created processes or system resources would be assigned the same trust level as the trust level of the created process. In other words, a created process may not create a process or system resource with a trust level that dominates the trust level of the created process. In other implementations, for example, when an operating system implements authentication impersonation, a created process may call a service to perform some function on the behalf of the created process, and where the trust level of the process executing the service call is a minimum trust level of the original created process and the service. In this way, a called service would not operate or execute at a trust level that would dominate the calling service, thereby preventing the service from affecting any system resources or processes at a greater trust level. Therefore, in this example, the same service may execute in different instantiations at different trust levels, depending on the trust level of the calling process.

In this implementation, the process authentication component may use the resource permission sets according to the dimensions and levels illustrated in FIG. 2. Specifically, in this example, the software publisher may use one of six different encryption keys for creating the digital signature, where each of the six different encryption keys may correspond to one of the six different dimension and level tuples of {D1,L1}, {D1,L2}, {D1,L3}, {D2,L1}, {D2,L2}, or {D2,L3}. In this way, the process authentication component, depending on which decryption key corresponds to the encryption key, upon successfully authenticating the executable file, may create a process to execute the executable file with a resource access permission trust level corresponding to one of the six different dimension and level tuples of {D1,L1}, {D1,L2}, {D1,L3}, {D2,L1}, {D2,L2}, or {D2,L3}. Further, in some implementations, each set or sets of resource access permissions specific to a resource may be mapped to a given trust level, for example, according to a mapping provided from a system administrator with sufficient privileges.

Further, the created process may be tagged with metadata specifying a dimension and level corresponding to resource access privileges. In some implementations, the process authentication component may otherwise associate a process with dimension and level corresponding to resource access privileges.

Illustrative Resource Permissions Component

Figure 6:
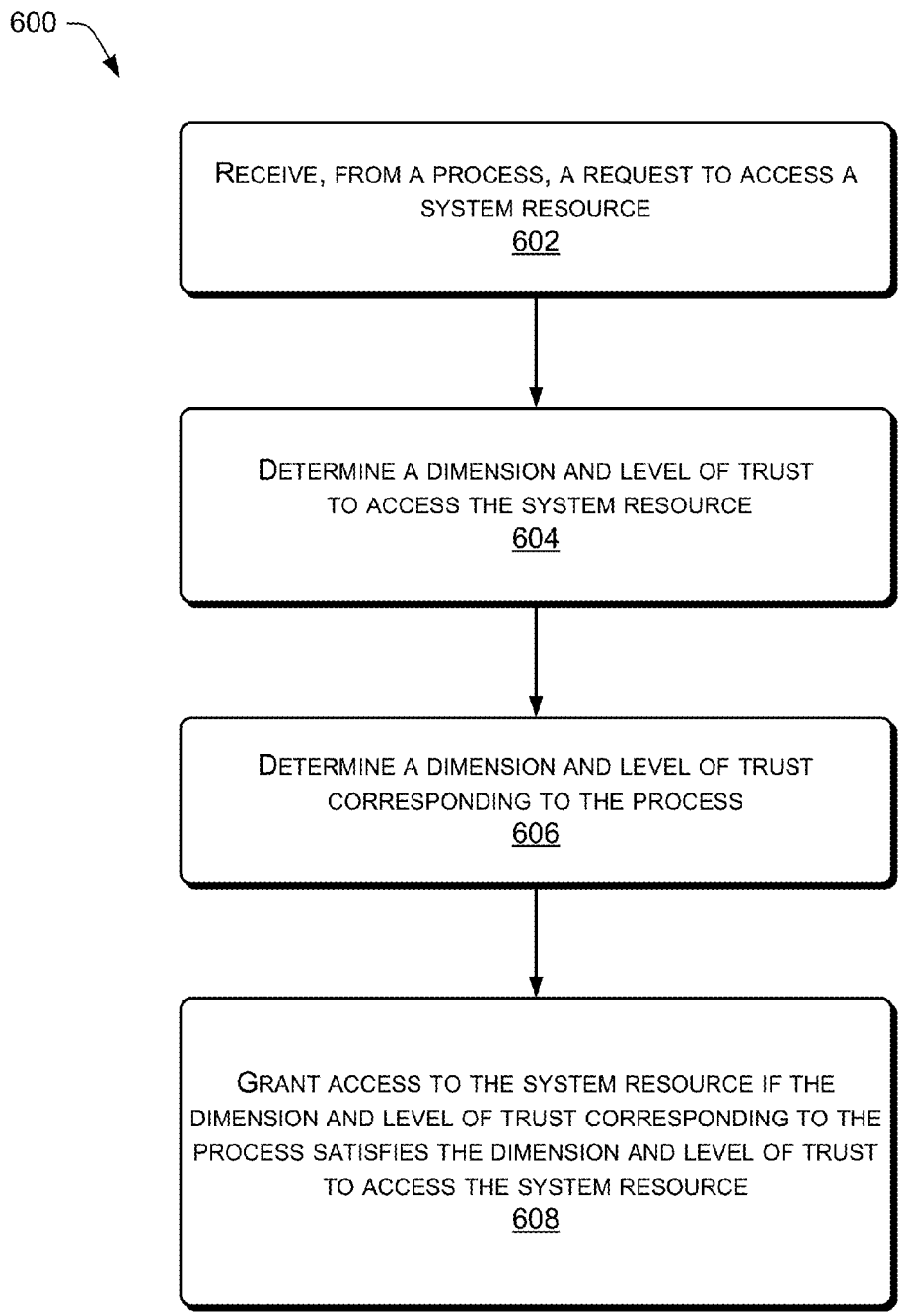
FIG. 6 illustrates a flowchart of a method to assign a dimension and level to a process after authenticating the process, according to some implementations.

FIG. 6 illustrates a flowchart 600 depicting selected operations in an implementation of a resource permissions component operating within a secure processing system of an operating system. A resource permissions component may be used within a secure processing system whenever a system resource is accessed for reading, moving, editing, or any type of modification from a current state for the system resource. The term "system resource" may be understood to potentially include the resources of additional applications installed on the system any time during or after initial system installation.

In this illustrative implementation, under various scenarios, a given process within an operating system may at some point attempt to access a system resource, and the resource permissions component may determine whether or not the process may be granted access to the system resource. For example, a process may request access to a particular system resource. As depicted at 602, the request for accessing the resource from the process may be received. In response, as depicted at 604, a minimum dimension and a minimum level sufficient to access the system resource may be determined.

In different implementations, the dimension and level information may be stored within metadata associated with the system resource. As discussed in regard to FIG. 3, a mapping may be provided that specifies a dominance relationship between each pair of trust levels. In the case the system resource is a software element, the metadata may be stored as part of the system resource. However, in some cases, the metadata may be stored in a table or other type of data structure that associates resource access permissions with the system resource.

As depicted at 606, the dimension and level information corresponding to the process making the resource request is determined. In different implementations, the operations related to 604 and 606 may be interchanged. The dimension and level information for a given process may be stored in a system file, or a register, or some other data structure that associates processes with metadata specifying resource access permissions.

In some implementations, to determine whether or not to grant the requested access to a process or user, the resource permissions component may make two comparisons. One comparison may be to determine whether or not the dimension associated with the process is sufficient, and another comparison may be to determine whether or not the level associated with the process is sufficient. In other words, as depicted at 608, if the dimension associated with the process dominates the dimension sufficient for accessing the system resource, and if the level associated with the process dominates the level sufficient for accessing the system resource, then access is granted to the system resource.

Illustrative Secure Processing Module

Figure 7:
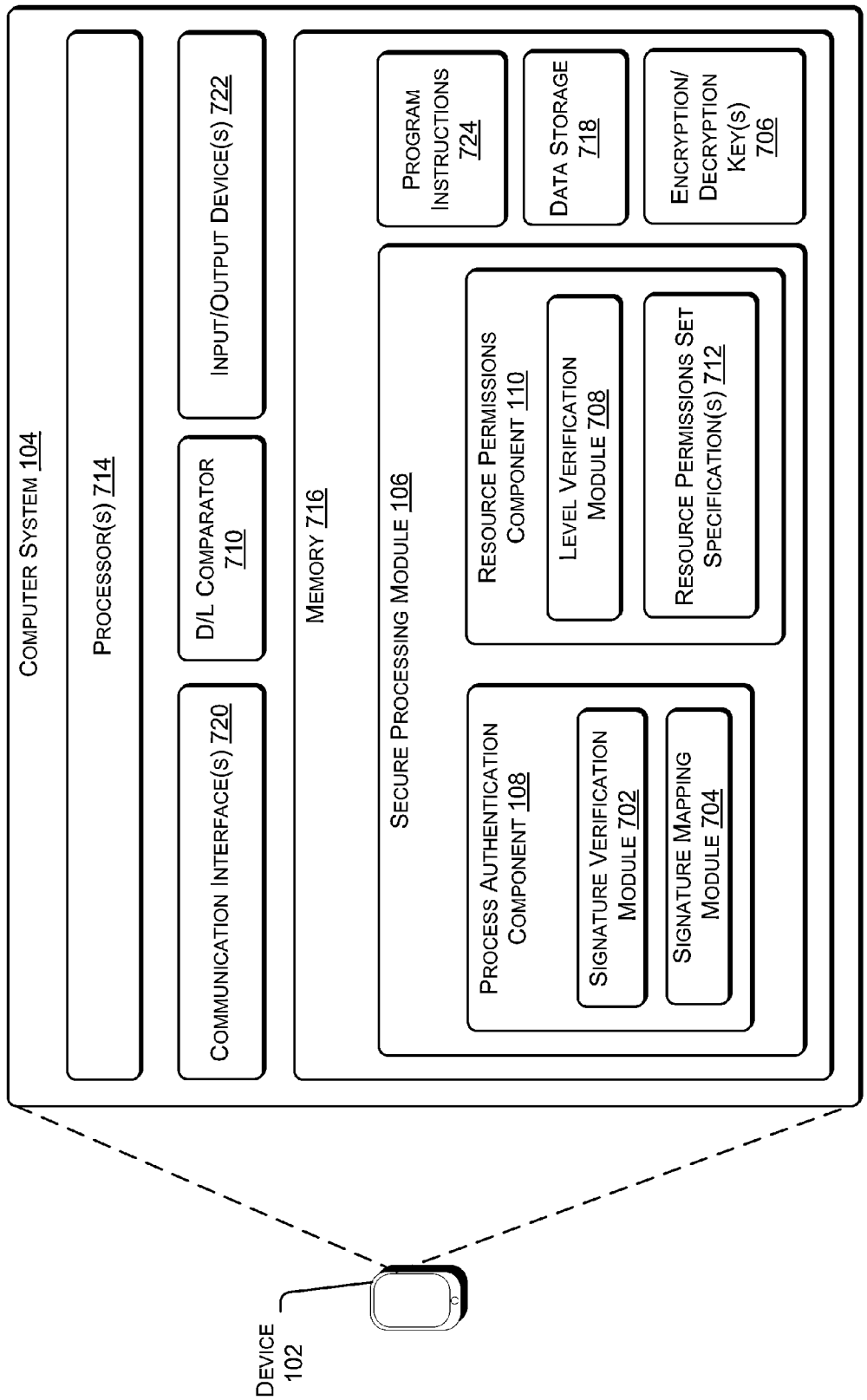
FIG. 7 illustrates a computing device that may be configured to implement a secure processing module that includes a process authentication component and resource permissions component, according to some implementations.

FIG. 7 illustrates computing device 102 described above in regard to FIG. 1 with additional computing elements, where computing device 102 may be configured to implement a secure processing system. Specifically, computing device 102 may include computer system 104, which may be configured to execute the various implementations of secure processing system. The secure processing system in turn may be implemented with secure processing module 106, which includes process authorization component 108 and resource permissions component 110.

As discussed above in regard to different implementations, the process authentication component may operate to perform signature verification and to map a given digital signature to a corresponding trust level, which may be mapped by a resource permissions component to specific permission sets. In this example, as part of the process authentication component 108, signature verification module 702 may serve to determine an appropriate decryption key for authenticating an executable file corresponding to a digital signature. Further, depending on which decryption key serves to authenticate the executable file, the signature mapping module 704 of the process authentication component 108 may determine a dimension and level corresponding to the digital signature, and tag the process created to execute the executable file. Various encryption and/or decryption keys may be stored within memory 706, for example the encryption key(s) 126 and/or decryption key(s) 128.

As discussed above in regard to different implementations, the resource permissions component 110 may—in response to a process request to access a system resource—determine minimum permissions sufficient to access the resource and determine whether or not the dimension and level permissions for the resource are sufficient for accessing the resource. In this implementation, as part of the resource permissions component 110, the level verification module 708 may serve to perform the calculations for determining whether a process with a given dimension and level of permissions may access a given resource. In some cases, these comparison calculations may be performed in parallel. For example, computer system 104 may implement a specialized instruction such that the specialized instruction defines operands for the dimension and level of the process and for the dimension and level sufficient to access the resource. Further, the operands for the specialized instruction may serve as input to a hardware element that performs the dimension and level comparisons simultaneously and outputs a flag value indicating whether or not permission to a resource is granted. In this example, this parallel dimension and level computation may be performed with dimension/level (D/L) comparator 710.

In some implementations, the specifications for determining whether a given dimension and level for a process is sufficient to access a resource that requires at least a given dimension and level may be stored within resource permissions set specification(s) 712.

FIG. 7 further illustrates additional components of computing device 102. In different implementations, the computer system may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

In one implementation, computer system 104 includes one or more processors 714 coupled to system memory 716. The one or more processors 714 may be configured to process data stored in association with computer-readable media. Computer-readable media includes, at least, two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by computing device 102.

By contrast, communication media may embody computer-readable instructions, data structures, program modules, or other data in a modulated data signal, such as a carrier wave, or other transmission mechanism. As defined herein, computer storage media does not include communication media.

The computer system 104 may also include memory 716 that is accessible to the one or more processors 714. The memory 716, including data storage 718, is an example of computer storage media. Further, computer system 104 may include one or more communication interfaces 720 that may facilitate communication between computing device 102 and other computing devices. In particular, the communication interfaces 720 may include one or more wired network communication interfaces, one or more wireless communication interfaces, or both, to facilitate communication via one or more networks represented by network 112. The network 112 may be representative of any one or combination of multiple different types of wired and wireless networks, such as the Internet, cable networks, satellite networks, wide area wireless communication networks, wired local area networks, wireless local area networks, public switched telephone networks (PSTN), and the like.

Additionally, computer system 104 may include input/output devices 722. The input/output devices 722 may include a keyboard, a pointer device, (e.g. a mouse or a stylus), a touch screen, one or more image capture devices (e.g. one or more cameras), one or more microphones, a display, speakers, and so forth.

In some implementations, it is contemplated that implementations of the invention may be implemented using a single instance of a computer system, while in other implementations may be implemented on multiple such systems, or multiple nodes making up a computer system, may be configured to host different portions or instances of implementations. For example, in one implementation some elements may be implemented via one or more nodes of the computer system that are distinct from those nodes implementing other elements.

The memory within the computer system may include program instructions 724 configured to implement each of the implementations described herein. In one implementation, the program instructions may include software elements of implementations of the modules discussed herein. The data storage within the computer system may include data that may be used in other implementations.

Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system for granting a process access to a system resource, the system comprising:
   one or more processors;
   a memory device communicatively coupled to the one or more processors;
   a process authentication component stored in the memory device containing instructions that, when executed by the one or more processors, cause the one or more processors to:
   receive an executable file that includes a digital signature;
      select a public decryption key corresponding to a private encryption key used to generate the digital signature;
      authenticate the executable file by verifying the digital signature with the public decryption key; and
      create a process for executing the authenticated executable file, and assigning to the process both a dimension and a level based on the public decryption key, wherein the dimension is one of a plurality of ranked dimensions and the level is one of a plurality of ranked levels, wherein based at least on the levels of the plurality of ranked levels being within at least two different dimensions of the plurality of ranked dimensions,
         a higher level that is within a lower dimension does not inherit resource permissions of any levels that are within a higher dimension;
         a higher level that is within a higher dimension inherits resource permissions of levels equal to or less than the higher level that are within a lower dimension;
      based at least on the levels of the plurality of ranked levels being within a single dimension, a higher level inherits all resource permissions of lower levels; and
   a resource permissions component stored in the memory device containing instructions that, when executed by the one or more processors, cause the one or more processors to:
      receive, from the process, a request to access a system resource;
      determine a minimum dimension and a minimum level sufficient to access the system resource; and
      grant or deny the process access to the system resource based at least on the determination.

2. The system as recited in claim 1, wherein selecting the public decryption key comprises determining, from among a plurality of public decryption keys, that the public decryption key is a particular public decryption key that decrypts the digital signature.

3. The system as recited in claim 1, wherein selecting the public decryption key comprises:
   determining an identity of a publisher of the executable file;
   transmitting, to a certificate authority, a request for a plurality of public decryption keys;
   receiving, from the certificate authority, a response including the plurality of public decryption keys; and
   determining, from among the plurality of public decryption keys, that the public decryption key is a particular public decryption key that decrypts the digital signature.

4. The system as recited in claim 1, wherein selecting the public decryption key comprises:
   determining an identity of a publisher of the executable file;
   transmitting, to a certificate authority, a request for the public decryption key corresponding to the digital signature, wherein the request includes the digital signature; and
   receiving, from the certificate authority, a response including the public decryption key.

5. The system as recited in claim 1, wherein the digital signature is created with one of a plurality of private encryption keys, and wherein each of the plurality of private encryption keys maps to a different combination of dimension and level.

6. The system as recited in claim 1, wherein at least one level within a dimension is reserved for system operations and is not granted to any human users.

7. The system as recited in claim 1, wherein assigning to the process the dimension and the level further comprises tagging the process within an operating system with metadata specifying the dimension and the level.

8. A method, comprising:
   performing, by one or more computing devices:
      receiving an executable file that includes a digital signature;
      selecting a public decryption key corresponding to the digital signature;
      authenticating the executable file, by verifying the digital signature with the public decryption key; and
      in response to authentication of the executable file:
         creating a process for executing the authenticated executable file;
         assigning to the process, based on the public decryption key, both a dimension and a level, wherein the dimension is one of a plurality of ranked dimensions and the level is one of a plurality of ranked levels, wherein based at least on the levels of the plurality of ranked levels being within at least two different dimensions of the plurality of ranked dimensions,
            a higher level that is within a lower dimension does not inherit resource permissions of any levels that are within a higher dimension;
            a higher level that is within a higher dimension inherits resource permissions of levels equal to or less than the higher level that are within a lower dimension;
         based at least on the levels of the plurality of ranked levels being within a single dimension, a higher level inherits all resource permissions of lower levels;
         receiving, from the process, a request to access a system resource;
         determining a minimum dimension and a minimum level sufficient to access the system resource;
         granting or denying the process access to the system resource based at least on the determining.

9. The method as recited in claim 8, wherein the dimension assigned to the process is a first dimension of two dimensions, wherein the first dimension corresponds to a first plurality of levels, wherein a second dimension of the two dimensions corresponds to a second plurality of levels, and wherein there are more levels in the second plurality of levels than in the first plurality of levels.

10. The method as recited in claim 9, wherein at least one level within the first dimension of the two dimensions is reserved for system operations and is not granted to any human users.

11. The method as recited in claim 8, wherein the digital signature is created with one of a plurality of private encryption keys, and wherein each of the plurality of private encryption keys maps to a different combination of dimension and level.

12. The method as recited in claim 8, wherein selecting the public decryption key comprises determining, from among a plurality of public decryption keys, that the public decryption key is a particular public decryption key that decrypts the digital signature.

13. The method as recited in claim 8, wherein there is a plurality of dimensions and a plurality of levels, and within at least one level within a first dimension of the plurality of dimensions is reserved for system operations and is not granted to any human users.

14. The method as recited in claim 8, wherein assigning to the process the dimension and the level further comprises tagging the process within an operating system with metadata specifying the dimension and the level.

15. One or more computer-readable storage devices storing computer-executable instructions that, when executed by one or more processors, cause the one or more processors to perform acts comprising:
receiving an executable file that includes a digital signature;
determining, from among a plurality of public decryption keys, a public decryption key corresponding to a private encryption key used to generate the digital signature, wherein each of the plurality of public decryption keys maps to a different trust level, wherein the trust level is a tuple defined according to a dimension parameter and a level parameter as {D, L}, wherein:
a higher level that is within a lower dimension does not inherit resource permissions of any levels that are within a higher dimension;
a higher level that is within a higher dimension inherits resource permissions of levels equal to or less than the higher level that are within a lower dimension;
based at least on the levels of the plurality of ranked levels being within a single dimension, a higher level inherits all resource permissions of lower levels;
authenticating the executable file by verifying the digital signature with the public decryption key; and
in response to authenticating the executable file:
creating a process for executing the authenticated executable file;
assigning, based on the public decryption key mapping to a particular trust level, trust level to the process;
receiving, from the process, a request to access a system resource;
determining a trust level sufficient to access the system resource;
granting the process access to the system resource based at least on the trust level assigned to the process $\{D_p, L_p\}$ satisfying the trust level sufficient to access the system resource $\{D_a, L_a\}$, wherein the trust level assigned to the process satisfies the trust level sufficient to access the system resource based at least on $D_p \geq D_a$ and $L_p \geq L_a$; and
denying the process access to the system resource based at least on the trust level assigned to the process $\{D_p, L_p\}$ not satisfying the trust level sufficient to access the system resource $\{D_a, L_a\}$, wherein the trust level assigned to the process does not satisfy the trust level sufficient to access the system resource based at least on $D_p < D_a$ or $L_p < L_a$.

16. The one or more computer-readable storage devices as recited in claim 15, wherein assigning the trust level to the process further comprises tagging the process within an operating system with metadata specifying the dimension and the level.

17. The one or more computer-readable storage devices as recited in claim 15, wherein the dimension is one of a plurality of dimensions and the level is one of a plurality of levels, and wherein:
based at least on all levels of the plurality of levels being within a same dimension, a higher level of the plurality of levels inherits all resource permissions of a lower level of the plurality of levels, and
based at least on the levels of the plurality of levels being within at least two different dimensions of the plurality of dimensions, a higher level of the plurality of levels that is within a lower dimension does not inherit all resource permissions of a lower level of the plurality of levels that is within a higher dimension.

18. The one or more computer-readable storage devices as recited in claim 15, wherein the digital signature is created with one of a plurality of private encryption keys, and wherein each of the plurality of private encryption keys maps to a different combination of dimension and level.

* * * * *